United States Patent
Hibino et al.

(10) Patent No.: US 10,094,261 B2
(45) Date of Patent: Oct. 9, 2018

(54) AMMONIA OCCLUSION AMOUNT ESTIMATION DEVICE AND METHOD, AND PURIFICATION CONTROL APPARATUS AND METHOD

(71) Applicant: NGK SPARK PLUG CO., LTD., Nagoya-shi, Aichi (JP)

(72) Inventors: Yoshinori Hibino, Kasugai (JP); Ryosuke Ichida, Düsseldorf (DE); Kentaro Mori, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 100 days.

(21) Appl. No.: 15/170,045

(22) Filed: Jun. 1, 2016

(65) Prior Publication Data

US 2016/0356195 A1 Dec. 8, 2016

(30) Foreign Application Priority Data

Jun. 2, 2015 (JP) .................................. 2015-112216
May 23, 2016 (JP) .................................. 2016-102637

(51) Int. Cl.
*F01N 3/00* (2006.01)
*F01N 3/10* (2006.01)
(Continued)

(52) U.S. Cl.
CPC ............... *F01N 3/208* (2013.01); *F01N 9/00* (2013.01); *F01N 2560/021* (2013.01);
(Continued)

(58) Field of Classification Search
CPC ......... F01N 2560/021; F01N 2560/026; F01N 2610/02; F01N 2900/0416;
(Continued)

(56) References Cited

U.S. PATENT DOCUMENTS 8,726,723 B2 * 5/2014 Clerc .................. G01M 15/102
73/114.75
9,435,246 B2 * 9/2016 Devarakonda .......... F01N 3/101
(Continued)

FOREIGN PATENT DOCUMENTS

JP 11-72478 A 3/1999
JP 2011-075546 A 4/2011
(Continued)

*Primary Examiner* — Phutthiwat Wongwian
*Assistant Examiner* — Diem Tran
(74) *Attorney, Agent, or Firm* — Sughrue Mion, PLLC

(57) ABSTRACT

A purification controller 12 is configured to estimate the amount of ammonia occluded (i.e. ammonia occlusion amount) in an SCR catalyst 4, which is arranged in an exhaust pipe 52 of a diesel engine 51 so as to purify NOx in an exhaust gas of the diesel engine 51. More specifically, the purification controller 12 acquires upstream NO concentration data, upstream $NO_2$ concentration data, downstream NOx concentration data, downstream $NO_2$ concentration data and downstream ammonia concentration data. The purification controller 12 further acquires an urea injection amount. Then, the purification controller 12 estimates the ammonia occlusion amount based on the acquired upstream NO concentration data, upstream $NO_2$ concentration data, downstream NOx concentration data, downstream $NO_2$ concentration data and downstream ammonia concentration data, the acquired urea injection amount and reaction formulas for reduction of NOx with the SCR catalyst 4.

7 Claims, 8 Drawing Sheets

(51) Int. Cl.
*F01N 3/20* (2006.01)
*F01N 9/00* (2006.01)

(52) U.S. Cl.
CPC .... *F01N 2560/026* (2013.01); *F01N 2610/02* (2013.01); *F01N 2900/0416* (2013.01); *F01N 2900/1622* (2013.01); *Y02T 10/24* (2013.01); *Y02T 10/47* (2013.01)

(58) Field of Classification Search
CPC .... F01N 2900/1622; F01N 3/208; F01N 9/00; Y02T 10/24; Y02T 10/47
USPC .......................... 60/276, 286, 295, 301, 303
See application file for complete search history.

(56) References Cited

U.S. PATENT DOCUMENTS

| | | | |
|---|---|---|---|
| 2010/0101213 A1* | 4/2010 | Tuomivaara | F01N 3/0231 60/276 |
| 2011/0048970 A1 | 3/2011 | Sugaya et al. | |
| 2014/0060012 A1 | 3/2014 | Kakimoto | |

FOREIGN PATENT DOCUMENTS

| | | |
|---|---|---|
| JP | 2014-062541 A | 4/2014 |
| JP | 2014-111918 A | 6/2014 |

* cited by examiner

AMMONIA OCCLUSION AMOUNT ESTIMATION DEVICE AND METHOD, AND PURIFICATION CONTROL APPARATUS AND METHOD

FIELD OF THE INVENTION

The present invention relates to a device for estimating an ammonia occlusion amount of a selective catalytic reduction catalyst. The present invention also relates to a purification control apparatus, an ammonia occlusion amount estimation method and a purification control method.

BACKGROUND OF THE INVENTION

Conventionally, there is known a system for purifying NOx in an exhaust gas of an internal combustion engine by arranging a SCR (Selective Catalytic Reduction) catalyst in an exhaust pipe of the internal combustion engine and injecting urea as a reducing agent to the SCR catalyst. For this purification system, it has been proposed to estimate the amount of ammonia occluded and stored in the SCR catalyst (hereinafter referred to as "ammonia occlusion amount") and control the amount of injection of the ammonia based on the estimated ammonia occlusion amount (see, for example, Patent Document 1: Japanese Laid-Open Patent Application Publication No. 2014-111918).

SUMMARY OF THE INVENTION

In Patent Document 1, however, the ammonia occlusion amount is estimated based on factors set according to the urea concentration, hydrolysis efficiency and NOx purification rate. This results in a low estimation accuracy of the ammonia occlusion amount.

The present invention has been made in view of the above problem. It is an object to improve ammonia occlusion amount estimation accuracy.

In order to achieve the above-mentioned object, there is provided according to a first aspect of the present invention an ammonia occlusion amount estimation device for estimating the amount of ammonia occluded in a selective catalytic reduction catalyst as an ammonia occlusion amount, the selective catalytic reduction catalyst being arranged in an exhaust pipe of an internal combustion engine so as to purify NOx in an exhaust gas of the internal combustion engine, the ammonia occlusion amount estimation device comprising a first data acquisition section, a second data acquisition section and an occlusion amount estimation section.

The first data acquisition sect on acquires first concentration identification data identifying an upstream NO concentration, an upstream $NO_2$ concentration, a downstream NO concentration, a downstream $NO_2$ concentration and a downstream ammonia concentration. The upstream NO concentration and the upstream $NO_2$ concentration refer to the concentrations of NO and $NO_2$ in the exhaust gas flowing into the selective catalytic reduction catalyst, respectively. The downstream NO concentration, the downstream $NO_2$ concentration and the downstream ammonia concentration refer to the concentration of NO, $NO_2$ and ammonia in the exhaust gas flowing out of the selective catalytic reduction catalyst, respectively.

The second data acquisition section acquires second concentration identification data identifying an upstream ammonia concentration. The upstream ammonia concentration refers to the concentration of ammonia flowing into the selective catalytic reduction catalyst.

The occlusion amount estimation section estimates the ammonia occlusion amount based on the first concentration identification data acquired by the first data acquisition section, the second concentration identification data acquired by the second data acquisition section and reaction formulas for reduction of NOx with the selective catalytic reduction catalyst.

As mentioned above, the ammonia occlusion amount estimation device of the first aspect is configured to identify the upstream NO concentration, the upstream $NO_2$ concentration, the downstream NO concentration, the downstream $NO_2$ concentration and the downstream ammonia concentration by acquisition of the first concentration identification data and to identify the upstream ammonia concentration by acquisition of the second concentration identification data.

The ammonia occlusion amount estimation device of the first aspect is further configured to estimate the ammonia occlusion amount based on the first concentration identification data, the second concentration identification data and the reaction formulas for reduction of NOx with the selective catalytic reduction catalyst. The reduction of NOx with the selective catalytic reduction catalyst refers to reduction reaction between ammonia and at least one of NO and $NO_2$. In the ammonia occlusion amount estimation device of the first aspect, the amount of ammonia reacted with NO and $NO_2$ is calculated from the upstream NO concentration, the upstream $NO_2$ concentration, the downstream NO concentration and the downstream $NO_2$ concentration; and the amount of ammonia not occluded in the selective catalytic reduction catalyst is calculated from the upstream ammonia concentration and the downstream ammonia concentration.

Namely, the ammonia occlusion amount estimation device of the first aspect is configured to identify the amounts of NO, $NO_2$ and ammonia on the upstream and downstream sides of the selective catalytic reduction catalyst, and then, estimate the ammonia occlusion amount from the identified upstream and downstream gas component amounts according to the reaction formulas. It is therefore possible in the first aspect to improve the estimation accuracy of the ammonia occlusion amount.

In order to achieve the above-mentioned object, there is also provided according to a second aspect of the present invention a purification control apparatus for controlling an urea supply unit to supply urea as a reducing agent to a selective catalytic reduction catalyst, the selective catalytic reduction catalyst being arranged in an exhaust pipe of an internal combustion engine so as to purify NOx in an exhaust gas of the internal combustion engine, the purification control apparatus comprising the ammonia occlusion amount estimation device of the first aspect and a supply control section.

The supply control section controls the supply of the urea from the urea supply unit based on the ammonia occlusion amount estimated by the ammonia occlusion amount estimation device.

Namely, the purification control apparatus of the second aspect is configured to control the supply of the ammonia and thereby identify the amount of ammonia supplied to the selective catalytic reduction catalyst. Further, the purification control apparatus of the second aspect is provided with the ammonia occlusion amount estimation device of the first aspect. It is therefore possible in the second aspect to obtain the same effects as in the first aspect.

Each of the ammonia occlusion amount estimation device of the first aspect and the purification control apparatus of the second aspect may have an upstream NOx sensor, an upstream NO₂ sensor, a downstream NOx sensor, a downstream ammonia sensor, an upstream concentration determination section and a downstream concentration determination section. In this case, at least either the upstream NOx and NO₂ sensors or the downstream NOx and ammonia sensors are combined into one as an integrated gas sensor.

The upstream NOx sensor detects, as an upstream NOx concentration, the concentration of NOx in the exhaust gas flowing into the selective catalytic reduction catalyst. The upstream NO₂ sensor detects the upstream NO₂ concentration. The downstream NOx sensor detects, as a downstream NOx concentration, the concentration of NOx in the exhaust gas flowing out of the selective catalytic reduction catalyst. The downstream ammonia sensor detects the downstream ammonia concentration. The upstream concentration determination section determines the upstream NO concentration based on the upstream NOx concentration and the upstream NO₂ concentration. The downstream concentration determination section determines the downstream NO concentration and the downstream NO₂ concentration based on the downstream NOx concentration and the downstream ammonia concentration.

In other words, the integrated gas sensor may be used for concentration detection on at least one of the upstream side and downstream side of the selective catalytic reduction catalyst in the ammonia occlusion amount estimation device of the first aspect or the purification control apparatus of the second aspect. In the case where the upstream NOx and NO₂ sensors are integrated as one gas sensor, the upstream NOx and NO₂ sensors are used to detect the NOx and NO₂ concentrations of the exhaust gas in substantially the same region. These upstream NOx and NO₂ sensors do not differ in their exhaust gas concentration detection region. By the use of such an integrated gas sensor, it is possible to farther improve the estimation accuracy of the ammonia occlusion amount. Similarly, the downstream NOx and ammonia sensors do not differ in their exhaust gas concentration detection region in the case where the downstream NOx and ammonia sensors are integrated as one gas sensor. It is also possible to farther improve the estimation accuracy of the ammonia occlusion amount by the use of such an integrated gas sensor.

In order to achieve the above-mentioned object, there is provided according to a third aspect of the present invention an ammonia occlusion amount estimation method for estimating the amount of ammonia occluded in a selective catalytic reduction catalyst as an ammonia occlusion amount, the selective catalytic reduction catalyst being arranged in an exhaust pipe of an internal combustion engine so as to purify NOx in an exhaust gas of the internal combustion engine, the ID ammonia occlusion amount estimation method comprising a first data acquisition step, a second data acquisition step and an occlusion amount estimation step.

In the first data acquisition step, first concentration identification data identifying an upstream NO concentration, an upstream NO₂ concentration, a downstream NO concentration, a downstream NO₂ concentration and a downstream ammonia concentration is acquired. The upstream NO concentration and the upstream NO₂ concentration refer to the concentrations of NO and NO₂ in the exhaust gas flowing into the selective catalytic reduction catalyst, respectively. The downstream NO concentration, the downstream NO₂ concentration and the downstream ammonia concentration refer to the concentration of NO, NO₂ and ammonia in the exhaust gas flowing out of the selective catalytic reduction catalyst, respectively.

In the second data acquisition step, second concentration identification data identifying as an upstream ammonia concentration is acquired. The upstream ammonia concentration refers to the concentration of ammonia flowing into the selective catalytic reduction catalyst.

In the occlusion amount estimation step, the ammonia occlusion amount is estimated based on the first concentration identification data acquired by the first data acquisition step, the second concentration identification data acquired by the second data acquisition step and reaction formulas for reduction of NOx with the selective catalytic reduction catalyst.

As the ammonia occlusion amount estimation method of the third aspect is executed in the ammonia occlusion amount estimation device of the first aspect, it is possible in the third aspect to obtain the same effects as in the first aspect.

In order to achieve the above-mentioned object, there is provided according to a fourth aspect of the present invention a purification control method for controlling an urea supply unit to supply urea as a reducing agent to a selective catalytic reduction catalyst, the selective catalytic reduction catalyst being arranged in an exhaust pipe of an internal combustion engine so as to purify NOx in an exhaust gas of the internal combustion engine, the purification control method comprising a first data acquisition step, a second data acquisition step, an occlusion amount estimation step and a supply control step.

In the supply control step, the supply of the urea from the urea supply unit is controlled based on the ammonia occlusion amount estimated by the ammonia occlusion amount estimation step.

As the purification control method of the fourth aspect is executed in the purification control apparatus of the second aspect, it is possible in the fourth aspect to obtain the same effects as in the second aspect.

DESCRIPTION OF EMBODIMENTS

Hereinafter, one embodiment of the present invention will be described below with reference to the drawings.

Figure 1:
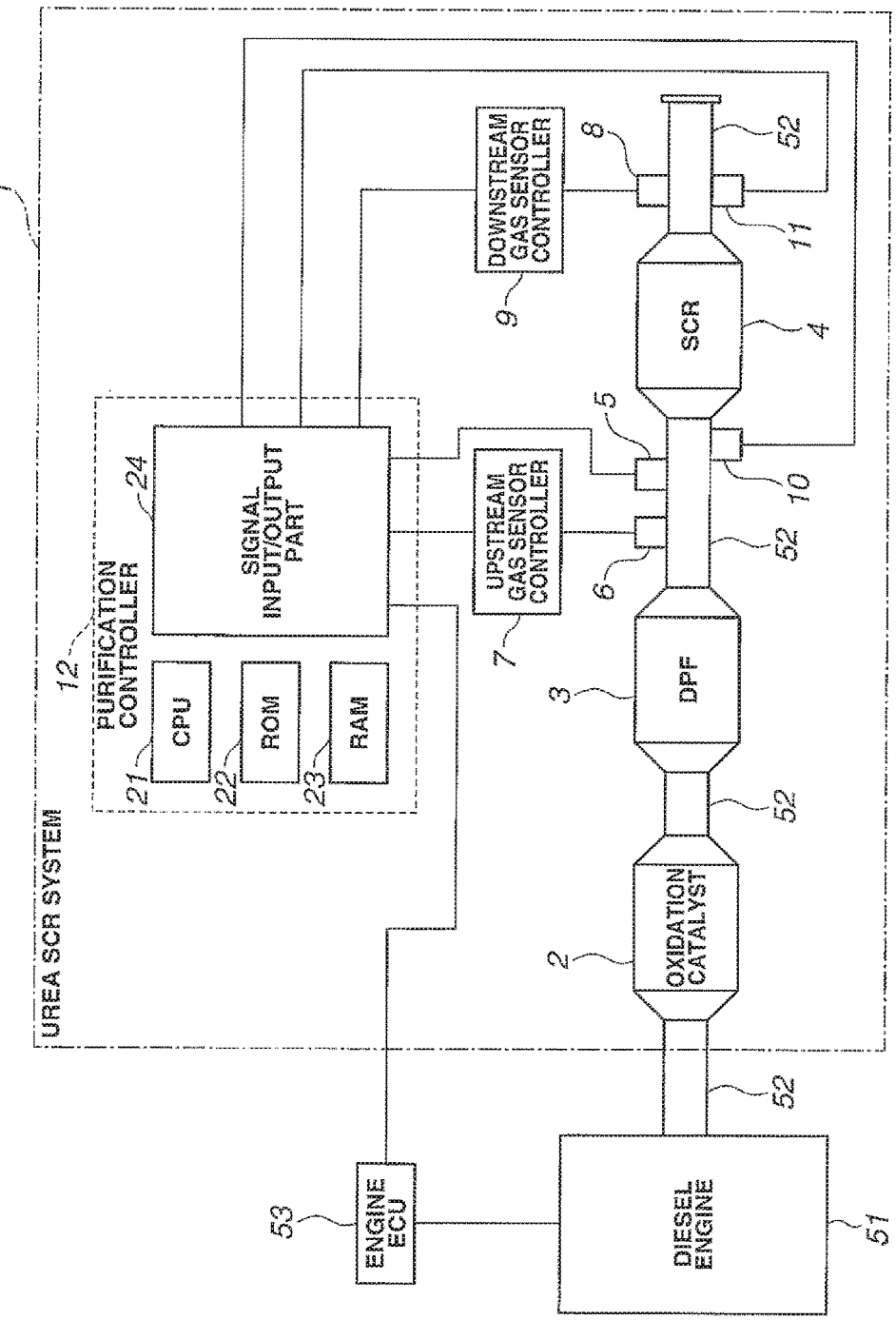
FIG. 1 is a schematic view of an urea SCR system 1 according to one embodiment of the present invention.

As shown in FIG. 1, an urea SCR (Selective Catalytic Reduction) system 1 according to one embodiment of the present invention includes an oxidation catalyst 2, a DPF (Diesel Particulate Filter) unit 3, an SCR catalyst 4, an aqueous urea injector 5, an upstream multi-gas sensor 6, an upstream gas sensor controller 7, a downstream multi-gas sensor 8, a downstream gas sensor controller 9, an upstream temperature sensor 10, a downstream temperature sensor 11 and a purification controller 12.

The oxidation catalyst 2 is arranged to take in an exhaust gas from a diesel engine 51 through an exhaust pipe 52 and oxidize nitric oxide (NO) in the exhaust gas to nitrogen dioxide ($NO_2$).

The DPF unit 3 is arranged to take in the exhaust gas flowing out of the oxidation catalyst 2 through the exhaust pipe 52 and remove particulate matter from the exhaust gas.

The SCR catalyst 4 is arranged to, while generating ammonia by hydrolysis of urea supplied from the upstream side, take in the exhaust gas flowing from the DPF unit 3 through the exhaust pipe 52, convert NOx in the exhaust gas to nitrogen and water by the reducing action of the generated ammonia and thereby release the NOx-reduced exhaust gas.

The aqueous urea injector 5 is arranged in the exhaust pipe 52 at a position between the DPF unit 3 and the SCR catalyst 4 to inject aqueous urea into the exhaust gas. The injected aqueous urea is hydrolyzed to ammonia gas under high-temperature conditions so that the ammonia gas is used as the reducing agent for reduction of NOx as mentioned above.

The upstream multi-gas sensor 6 is arranged in the exhaust pipe 52 at a position between the DPF unit 3 and the SCR catalyst 4 to detect the concentrations of NOx and $NO_2$ in the exhaust gas flowing out of the DPF unit 3.

The upstream gas sensor controller 7 is configured to control the operations of the upstream multi-gas sensor 6 and determine the concentrations of NO and $NO_2$ in the exhaust gas flowing out of the DPF unit 3 (hereinafter also referred to as "upstream NO concentration" and "upstream $NO_2$ concentration", respectively) based on the detection results of the upstream multi-gas sensor 6. Further, the upstream gas sensor controller 7 is configured to perform data communication with the purification controller 12 through a communication line such that upstream NO concentration data indicating the upstream NOx concentration and upstream $NO_2$ concentration data indicating the upstream $NO_2$ concentration can be transmitted to the purification controller 12.

The downstream multi-gas sensor 8 is arranged on the downstream side of the SCR catalyst 4 in the exhaust pipe 52 to detect the concentrations of NOx and ammonia in the exhaust gas flowing out of the SCR catalyst 4.

The downstream gas sensor controller 9 is configured to control the operations of the downstream multi-gas sensor 8 and determine the concentrations of NOx, $NO_2$ and ammonia in the exhaust gas flowing out of the SCR catalyst 4 (hereinafter referred to as "downstream NOx concentration", "downstream $NO_2$ concentration" and "downstream ammonia concentration", respectively) based on the detection results of the downstream multi-gas sensor 8. Further, the downstream gas sensor controller 9 is configured to perform data communication with the purification controller 12 through a communication line such that downstream NOx concentration data indicating the downstream NOx concentration, downstream $NO_2$ concentration data indicating the downstream $NO_2$ concentration and downstream ammonia concentration data indicating the downstream ammonia concentration can be transmitted to the purification controller 12.

The upstream temperature sensor 10 is arranged to detect the temperature of the exhaust gas flowing into the SCR catalyst 4 and output an upstream gas temperature signal indicating the detected exhaust gas temperature.

The downstream temperature sensor 11 is arranged to detect the temperature of the exhaust gas flowing out of the SCR catalyst 4 and output a downstream gas temperature signal indicating the detected exhaust gas temperature.

The purification controller 12 has, as its main body, a microcomputer equipped with a CPU 21, a ROM 22, a RAM 23 and a signal input/output part 24. The aqueous urea injector 5, the upstream gas sensor controller 7, the downstream gas sensor controller 9, the upstream temperature sensor 10 and the downstream temperature sensor 11 are connected to the signal input/output part 24. As mentioned above, the purification controller 12 is configured to perform data communication with the upstream gas sensor controller 7 and the downstream gas sensor controller 9 through the communication lines. The purification controller 12 is also configured to perform data communication with an electronic control unit 53 through a communication line. The electronic control unit 53 is arranged to control the operations of the diesel engine 51. Hereinafter, the electronic control unit 53 is also referred to as "engine ECU (Electronic Control Unit) 53".

Figure 2:
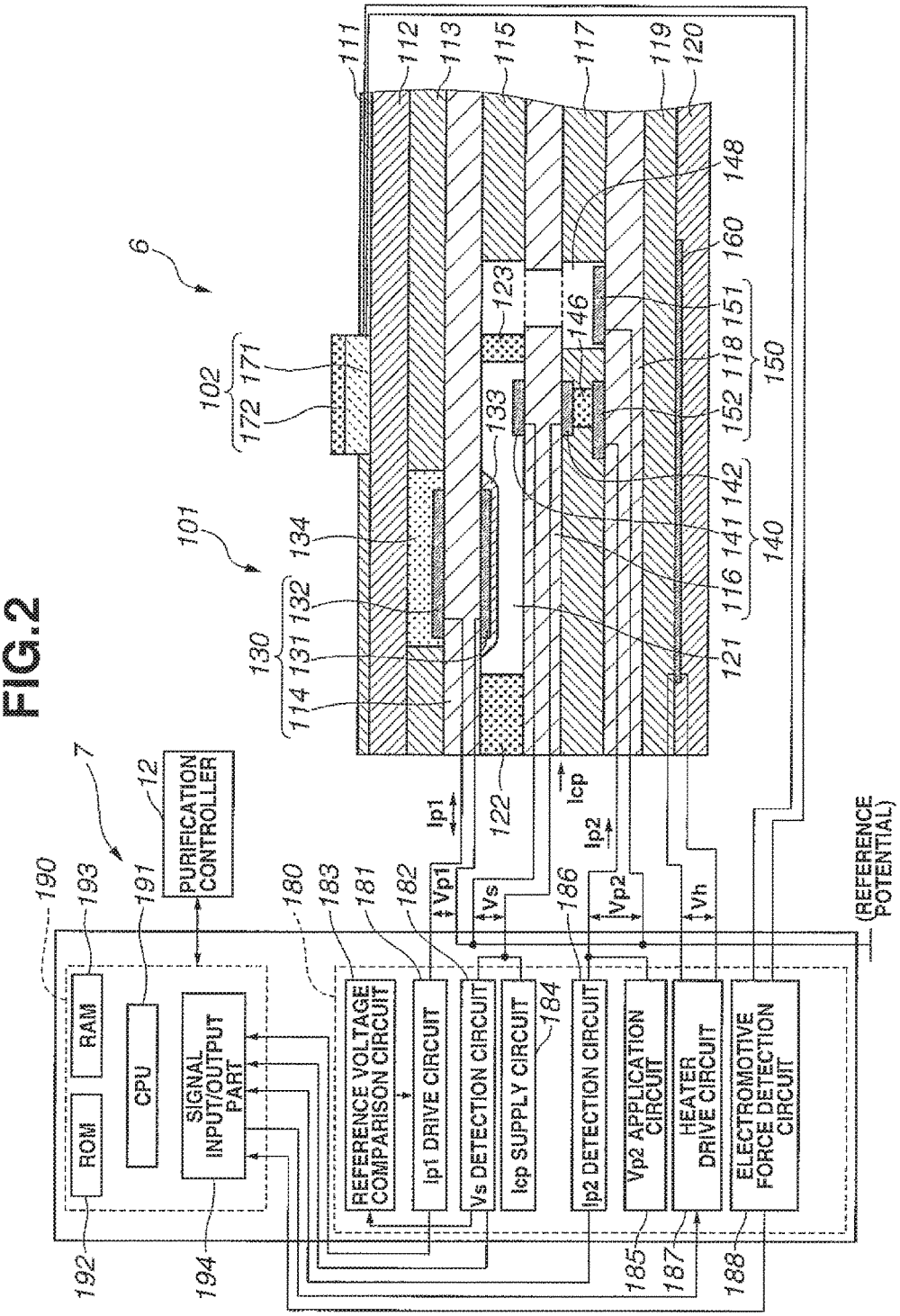
FIG. 2 is a configuration diagram of an upstream multi-gas sensor 6 and an upstream gas sensor controller 7 in the urea SCR system.

As shown in FIG. 2, the upstream multi-gas sensor 6 includes a NOx sensor unit 101 and a $NO_2$ sensor unit 102.

The NOx sensor unit 101 has an insulating layer 111, a solid electrolyte layer 112, an insulating layer 113, a solid electrolyte layer 114, an insulating layer 115, a solid electrolyte layer 116, an insulating layer 117, a solid electrolyte layer 118, an insulating layer 119 and an insulating layer 120 stacked together in this order. In the present embodiment, the insulating layer 111, 113, 115, 117, 119 and 120 are formed predominantly of alumina; the solid electrolyte layer 112 is formed of e.g. partially stabilized zirconia (YSZ); and the solid electrolyte layers 114, 116 and 118 are formed predominantly of oxygen ion conductive zirconia.

In the NOx detection unit 101, there is a first measurement chamber 121 defined between the solid electrolyte layer 114 and the solid electrolyte layer 116. A diffusion resistance member 122 is disposed between the solid electrolyte layer 114 and the solid electrolyte layer 116 at one side adjacent to the first measurement chamber 121 in the NOx detection unit 101 such that the exhaust gas is introduced from the outside into the first measurement chamber 121 via the diffusion resistance member 122. A diffusion resistance member 123 is disposed between the solid electrolyte layer 114 and the solid electrolyte layer 116 at the other side adjacent to the first measurement chamber 121 such that the exhaust gas is discharged to the outside of the first measurement chamber 121 via the diffusion resistance member 123. These diffusion resistance members 122 and 123 are formed of a porous material such as alumina.

The NOx sensor unit 101 has a first pumping cell 130 constituted by the solid electrolyte layer 114 and pumping electrodes 131 and 132. In the present embodiment, the pumping electrodes 131 and 132 are formed predominantly of platinum. The pumping electrode 131 is disposed on a surface of the solid electrolyte layer 114 in contact with the first measurement chamber 121. A protection layer 133 is formed of a porous material so as to cover a surface of the pumping electrode 131 facing the first measurement chamber 121. The pumping electrode 132 is disposed on a surface of the solid electrolyte layer 114 opposite from the pumping electrode 131. A portion of the insulating layer 113 corresponding in position to the pumping electrode 132 and its vicinity is removed. A porous material 134 is filled in this portion, in place of the insulating layer 113, so as to allow therethrough a flow of gas (oxygen) between the pumping electrode 132 and the outside.

The NOx sensor unit 101 also has an oxygen concentration detection cell 140 constituted by the solid electrolyte layer 116, a detection electrode 141 and a reference electrode 142. In the present embodiment, the detection electrode 141 and the reference electrode 142 are formed predominantly of platinum. The detection electrode 141 is disposed on a surface of the solid electrolyte layer 116 in contact with the first measurement chamber 121 at a position downstream of the pumping electrode 131 (i.e. a position closer to the diffusion resistance member 123 than the diffusion resistance member 122) within the first measurement chamber 121. The reference electrode 142 is disposed on a surface of the solid electrolyte layer 116 opposite from the detection electrode 141.

In the NOx sensor unit 101, there is a reference oxygen chamber 146 defined between the solid electrolyte layer 116 and the solid electrolyte layer 118 in contact with the reference electrode 142. The inside of the reference oxygen chamber 146 is filled with a porous material.

There is further a second measurement chamber 148 defined between the solid electrode layer 114 and the solid electrolyte layer 118 through the insulating layer 115, the solid electrode layer 116 and the insulating layer 117 in the NOx sensor unit 101 such that the exhaust gas discharged from the first measurement chamber 121 via the diffusion resistance member 123 is introduced into the second measurement chamber 148.

The NOx sensor unit 101 has a second pumping cell 150 constituted by the solid electrolyte layer 118 and pumping electrodes 151 and 152. In the present embodiment, the pumping electrodes 151 and 152 are formed predominantly of platinum. The pumping electrode 151 is disposed on a surface of the solid electrolyte layer 118 in contact with the second measurement chamber 148. The pumping electrode 152 is disposed on a surface of the solid electrolyte layer 118 facing the reference electrode 142 through the reference oxygen chamber 146.

The NOx sensor unit 101 has a heater 160. The heater 161 is in the form of a heating resistor composed predominantly of platinum or the like to generate heat upon energization thereof and is located between the insulating layer 119 and the insulating layer 120.

Figure 3:
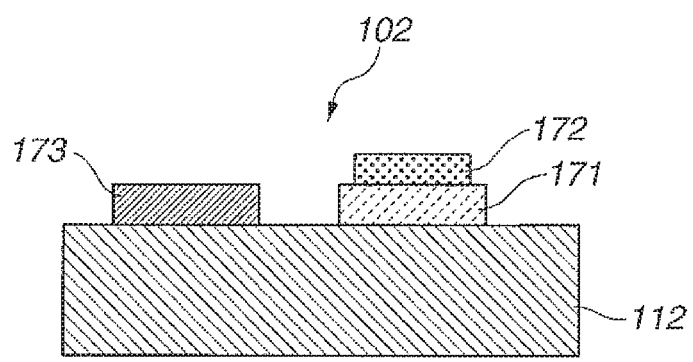
FIG. 3 is a section view of a NO₂ sensor unit 102 of the upstream multi-gas sensor.

The $NO_2$ sensor unit 102 is placed in an opening formed through the insulating layer 111 from a surface of the insulating layer 111 to the solid electrolyte layer 112. As shown in FIG. 3, the $NO_2$ sensor unit 102 has an intermediate layer 171, a detection electrode 172 and a reference electrode 173.

The intermediate layer 171 is located on the solid electrolyte layer 112. In the present embodiment, the intermediate layer 171 is formed of a material containing 50 mass % or more of oxygen ion conductive solid electrolyte as well as containing an oxide of at least one kind of metal selected from the group consisting of Co, Mu, Cu, Ni and Ce as a first metal oxide.

The detection electrode 172 is located on the intermediate layer 171. In the present embodiment, the detection electrode 172 is formed of a material containing 70 mass % or more of Au and containing no first metal oxide. It is unlikely that a combustible gas will be burned at a surface of the detection electrode 172. The detection electrode 172 allows $NO_2$ to pass therethrough electrode 172 and react with oxygen ions at an interface between the intermediate layer 171 and the detection electrode 172 electrode reaction) for $NO_2$ detection.

The reference electrode 173 is located apart from the intermediate layer 171 on the solid electrolyte layer 112. The combustible gas is burned at a surface of the reference electrode 173. In the present embodiment, the reference electrode 173 is formed of Pt or a material containing Pt as a main component.

The $NO_2$ sensor unit 102 is thus adapted to detect the concentration of $NO_2$ in the exhaust gas according to changes in electromotive force between the detection electrode 172 and the reference electrode 173.

As shown in FIG. 2, the upstream gas sensor controller 7 includes a control circuit module 180 and a microcomputer 190 (hereinafter also referred to as "micon 190").

The control circuit module 180 is in the form of an analog circuit module mounted on a circuit board. More specifically, the control circuit module 180 has a Ip1 drive circuit 181, a Vs detection circuit 182, a reference voltage comparison circuit 183, a Icp supply circuit 184, a Vp2 application circuit 185, a Ip2 detection circuit 186, a heater drive circuit 187 and an electromotive force detection circuit 188.

The pumping electrode 131, the detection electrode 141 and the pumping electrode 151 are connected to a reference potential. The pumping electrode 132 is connected to the Ip1 drive circuit 181. The reference electrode 142 is connected to the Vs detection circuit 182 and to the Icp supply circuit 184. The pumping electrode 152 is connected to the Vp2 application circuit 185 and to the Ip2 detection circuit 186. The heater 160 is connected to the heater drive circuit 187. The $NO_2$ sensor unit 102 is connected to the electromotive force detection circuit 188.

The Ip1 drive circuit 181 supplies a first pumping current Ip1 between the pumping electrode 131 and the pumping electrode 132 and detects u plied first pumping current Ip1.

The Vs detection circuit 182 detects a voltage Vs between the detection electrode 141 and the reference electrode 142 and outputs the detected voltage to the reference voltage comparison circuit 183.

The reference voltage comparison circuit 183 compares the output (voltage Vs) of the Vs detection circuit 182 with a reference voltage (e.g. 425 mV) and outputs the comparison result to the Ip1 drive circuit 181. The Ip1 drive circuit 181 controls the direction and intensity of flow of the first pumping current Ip1 such that the voltage Vs becomes equal to the reference voltage, and adjusts the concentration of oxygen in the first measurement chamber 121 to a predetermined level at which there does not occur decomposition of NOx.

The Icp supply circuit 184 supplies a small current Icp between the detection electrode 141 and the reference electrode 142. With the supply of such a small current, oxygen is pumped from the first measurement chamber 121 to the reference oxygen chamber 146 through the solid electrolyte layer 116 such that the concentration of oxygen in the reference oxygen chamber 146 becomes set to a predetermined reference oxygen concentration.

The Vp2 application circuit 185 applies a constant voltage Vp2 (e.g. 450 mV) between the pumping electrode 151 and the pumping electrode 152. With the application of such a constant voltage, NOx is dissociated (reduced) in the second measurement chamber 148 by the catalytic activities of the pumping electrodes 151 and 152 of the second pumping cell 150. The thus-obtained oxygen ions flow through the solid electrolyte layer 118 between the pumping electrode 151 and the pumping electrode 152, thereby developing a second pumping current Ip2. The Ip2 detection circuit 186 detects the developed second pumping current Ip2.

The heater drive circuit 187 drives the heater 160 by the application of a positive energization voltage to one end of the heating resistor and a negative energization voltage to the other end of the heating resistor.

The electromotive force detection circuit 188 detects the electromotive force developed between the detection electrode 172 and the reference electrode 173.

The microcomputer 190 has a CPU 191, a ROM 192, a RAM 193 and a signal input/output part 194.

The CPU 191 performs various processing for control of the upstream multi-gas sensor 6 according to programs stored in the ROM 192. The signal input/output part 194 is connected to the Ip1 drive circuit 181, the Vs detection circuit 182, the Ip2 detection circuit 186, the heater drive circuit 187 and the electromotive force detection circuit 188.

The CPU 191 receives the signals from the circuits 181, 182, 186 and 188 through the signal input/output part 194 and determines the NOx and $NO_2$ concentrations of the exhaust gas based on these received signals. Further, the CPU 191 outputs a drive signal to the heater drive circuit 187 through the signal input/output part 194 and thereby controls the heater 160.

Figure 4:
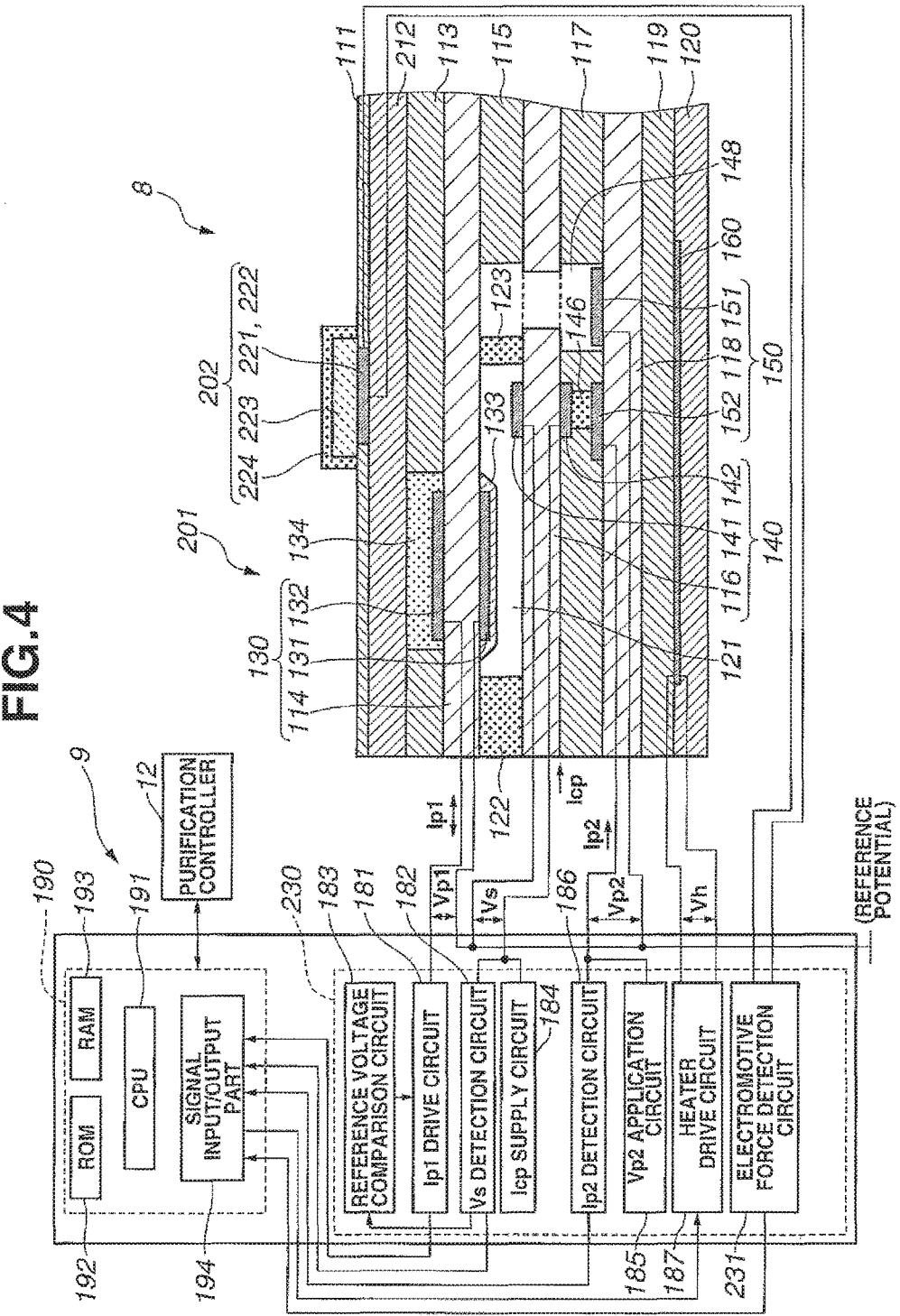
FIG. 4 is a configuration diagram of a downstream multi-gas sensor 8 and a downstream gas sensor controller 9 in the urea SCR system.

As shown in FIG. 4, the downstream multi-gas sensor 8 includes a NOx sensor unit 201 and an ammonia sensor unit 202.

The NOx sensor unit 201 has the same structure as the NOx sensor unit 101 of the upstream multi-gas sensor 6, except that a solid electrolyte layer 212 is provided in place of the solid electrolyte layer 112. In the present embodiment, the solid electrolyte layer 212 is formed predominantly of oxygen ion conductive zirconia.

The ammonia sensor unit 202 has a detection electrode 221, a reference electrode 222, a selective reaction layer 223 and a diffusion layer 224.

Figure 5:
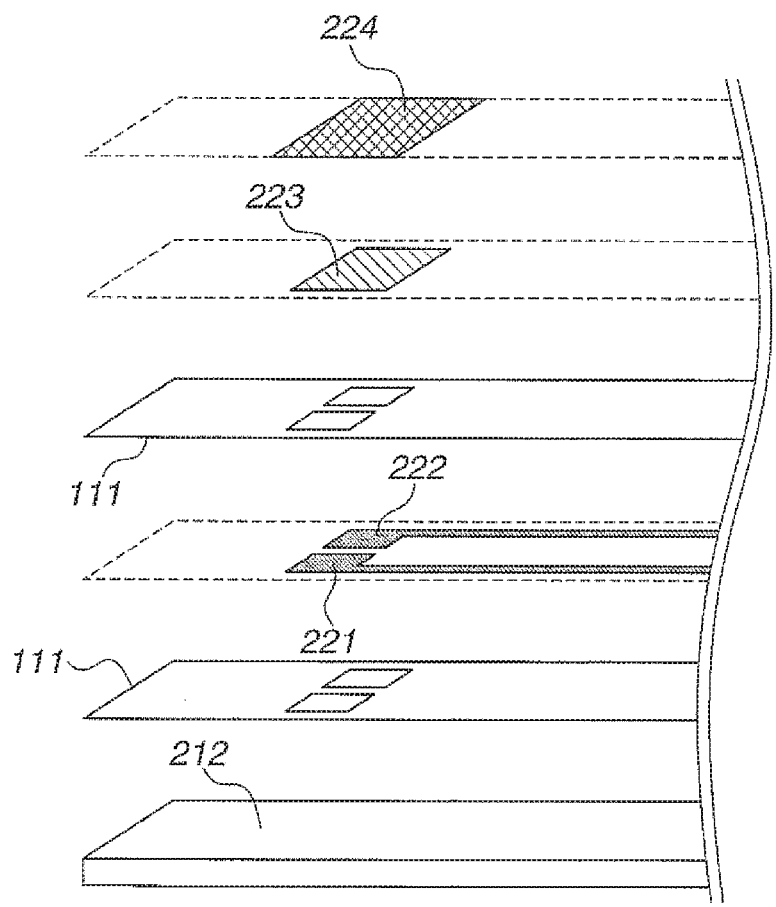
FIG. 5 is an exploded perspective view of an ammonia sensor unit 202 of the downstream multi-gas sensor.

As shown in FIG. 5, the detection electrode 221 and the reference electrode 222 are located apart from each other on the solid electrolyte layer 212. In the present embodiment, the detection electrode 221 is formed of a material containing gold as a main component; and the reference electrode 222 is formed of a material containing platinum as a main component. Since the detection electrode 221 shows higher reactivity to ammonia than the reference electrode 222, there is developed an electromotive force between the detection electrode 221 and the reference electrode 222.

The selective reaction layer 223 is formed predominantly of a metal oxide so as to cover the detection electrode 221 and the reference electrode 222. The selective reaction layer 223 has the function of combusting any combustible gas component other than ammonia such that the ammonia sensor unit 202 can detect ammonia in the exhaust gas without being influenced by the combustible gas component.

The diffusion layer 224 is formed of a porous material so as to cover the selective reaction layer 223. The diffusion layer 224 has the function of adjusting the diffusion rate of the exhaust gas introduced from the outside into the ammonia sensor unit 202.

The downstream gas sensor controller 9 includes a control circuit module 230 and a microcomputer 190 as shown in FIG. 4.

The control circuit module 230 is different from the control circuit module 180 of the upstream gas sensor controller 7, in that an electromotive force detection circuit 231 is provided in place of the electromotive force detection circuit 188. The electromotive force detection circuit 231 detects the electromotive force developed between the detection electrode 221 and the reference electrode 222 (hereinafter referred to as "ammonia electromotive force EMF") and outputs the detection result as a detection signal to the signal input/output part 194 of the microcomputer 190.

Figure 6:
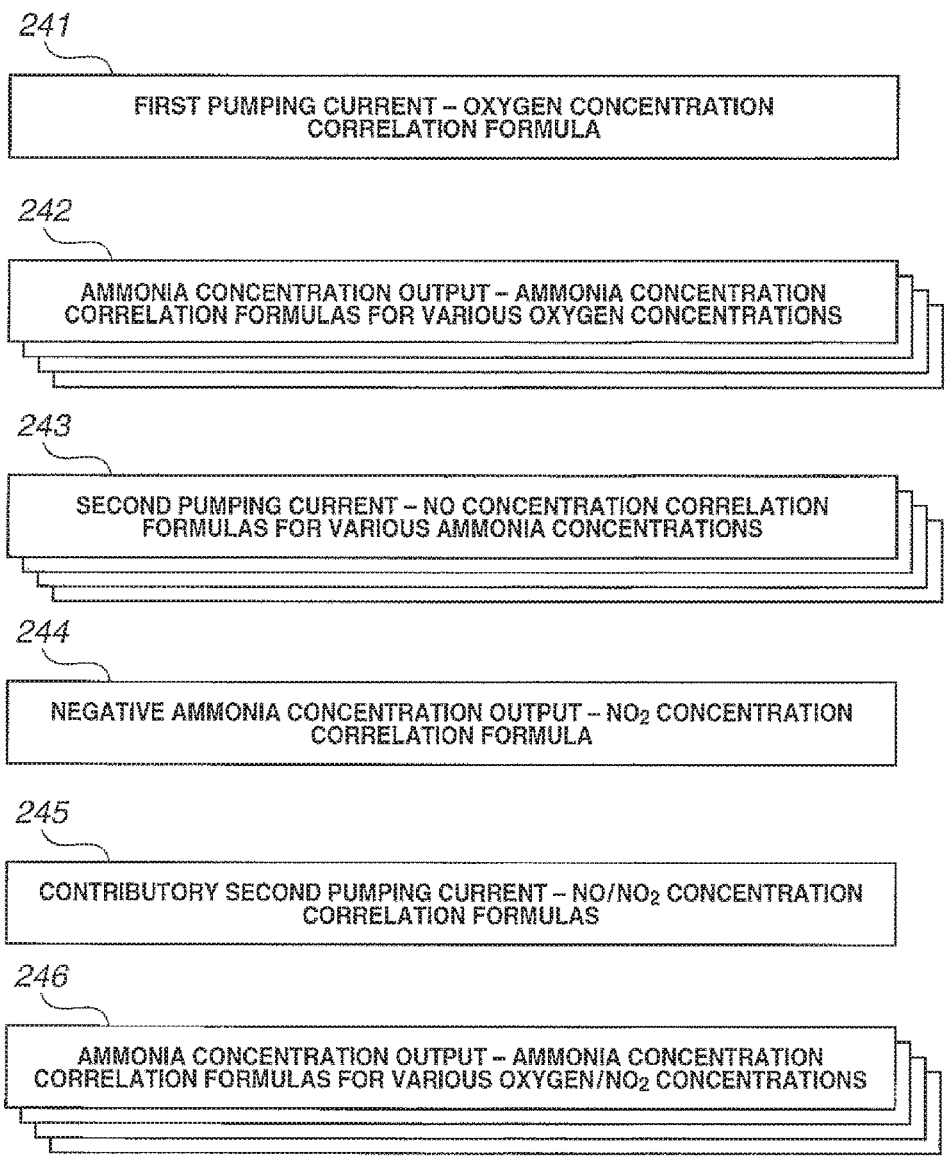
FIG. 6 is a block diagram showing various data items stored in the downstream gas sensor controller 9.

As shown in FIG. 6, the ROM 192 of the microcomputer 190 stores therein a first pumping current (Ip1)-oxygen concentration relation formula 241, an ammonia concentration output (electromotive force EMF)-ammonia concentration correlation formula 242, a second pumping current (Ip2)-NO concentration correlation formula 243, a negative ammonia concentration output-$NO_2$ concentration correlation formula 244, contributory second pumping current-NO/$NO_2$ concentration correlation formulas 245 and an ammonia concentration output-ammonia concentration correlation formula 246.

The first pumping current (Ip1)-oxygen concentration correlation formula 241 represents a correlation between the first pumping current (Ip1) and the oxygen concentration of the exhaust gas. The oxygen concentration of the exhaust gas can be determined according to the first pumping current-oxygen concentration correlation formula 241.

There are a plurality of ammonia concentration output-ammonia concentration correlation formulas 242 set for various oxygen concentrations. The ammonia concentration output-ammonia concentration correlation formula 242 represents a correlation between the ammonia concentration output of the ammonia sensor unit 202 and the ammonia concentration of the exhaust gas. According to this correlation formula, the ammonia concentration of the exhaust gas can be determined accurately without being influenced by the oxygen concentration of the exhaust gas.

There are a plurality of second pumping current (Ip2)-NO concentration correlation formulas 243 set for various ammonia concentration. There are also a plurality of ammonia concentration output-ammonia concentration correlation formulas 246 set for various oxygen and $NO_2$ concentrations. The NO and $NO_2$ concentrations can be determined by the microcomputer 190 according to the second pumping current (Ip2)-NO concentration correlation formulas 243, the negative ammonia concentration output-$NO_2$ concentration correlation formula 244, the contributory second pumping current-NO/$NO_2$ concentration correlation formulas 245 and the ammonia concentration output-ammonia concentration correlation formula 246. The methods for determination of the NO and $NO_2$ concentrations is known from Japanese Laid-Open Patent Application Publication No. 2011-075546 etc. A detailed explanation of the NO and $NO_2$ concentration determination methods will be thus omitted.

The microcomputer 190 of the upstream gas sensor controller 7 executes an upstream gas concentration determination process.

The procedure of the upstream gas concentration determination process will be explained below. The upstream gas concentration determination process is initiated immediately after start-up of the microcomputer 190 of the upstream gas sensor controller 7.

Figure 7:
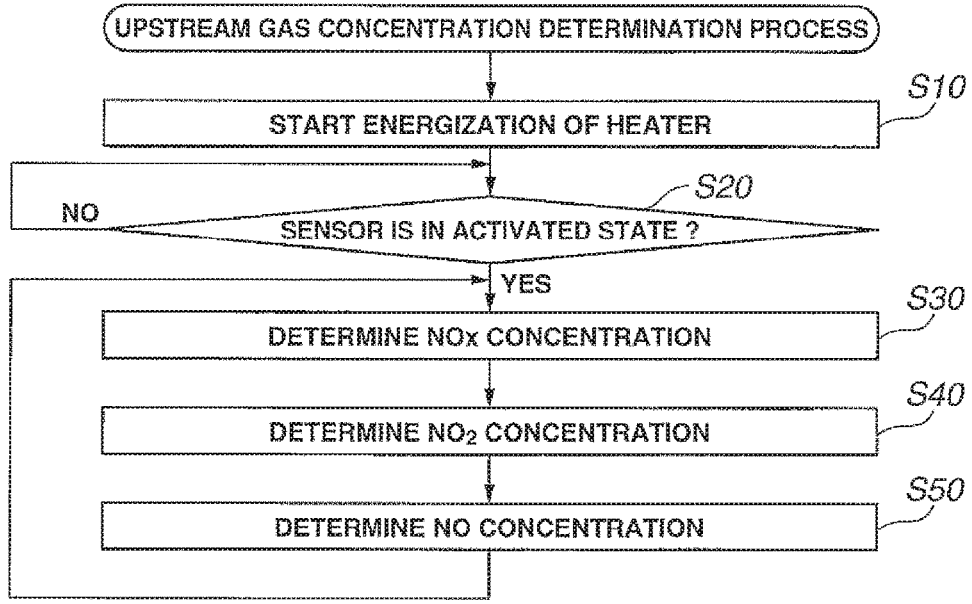
FIG. 7 is a flow chart of an upstream gas concentration determination process according to the one embodiment of the present invention.

Upon initiation of the upstream gas concentration determination process, the CPU 191 of the microcomputer 190 starts outputting a heater ON signal to the heater drive circuit 187 in step S10 so as to energize the heating resistor of the heater 160 as shown in FIG. 7. By this signal output, the heater 160 becomes energized to heat the upstream multi-gas sensor 6.

In step S20, the CPU judges whether the upstream multi-gas sensor 6 is in an activated state. The upstream multi-gas sensor 6 is judged as being in the activated state when the upstream multi-gas sensor 6 reaches an activation temperature. When the upstream multi-gas sensor 6 is not in the activated state (NO in step S20), the CPU repeats the processing of step S20 and thereby stands by until the upstream multi-gas sensor 6 becomes activated. When the upstream multi-gas sensor 6 is in the activated state (YES in step S20), the CPU determines the NOx concentration of the exhaust gas based on the first and second pumping currents Ip1 and Op2 in step S30. The method for determination of the NOx concentration based on the pumping currents Ip1 and Ip2 is known from Japanese Laid-Open Patent Application Publication No. H11-72478 etc. A detailed explanation of the NOx concentration determination method will be thus omitted.

In step S40, the CPU determines the $NO_2$ concentration of the exhaust gas based on the first pumping current Ip1 and the electromotive force. The method for determination of the $NO_2$ concentration based on the first pumping current and the electromotive force is known from Japanese Laid-Open Patent Application Publication No. 2014-62541 etc. A detailed explanation of the $NO_2$ concentration determination method will be thus omitted.

In step S50, the CPU determines the NO concentration of the exhaust gas by subtracting the $NO_2$ concentration determined in step S40 from the NOx concentration determined in step S30. After that, the CPU proceeds to step S30.

Further, the microcomputer 190 of the downstream gas sensor controller 9 executes a downstream gas concentration determination process.

The procedure of the downstream gas concentration determination process will be explained below. The downstream gas concentration determination process is initiated immediately after start-up of the microcomputer 190 of the downstream gas sensor controller 9.

Figure 8:
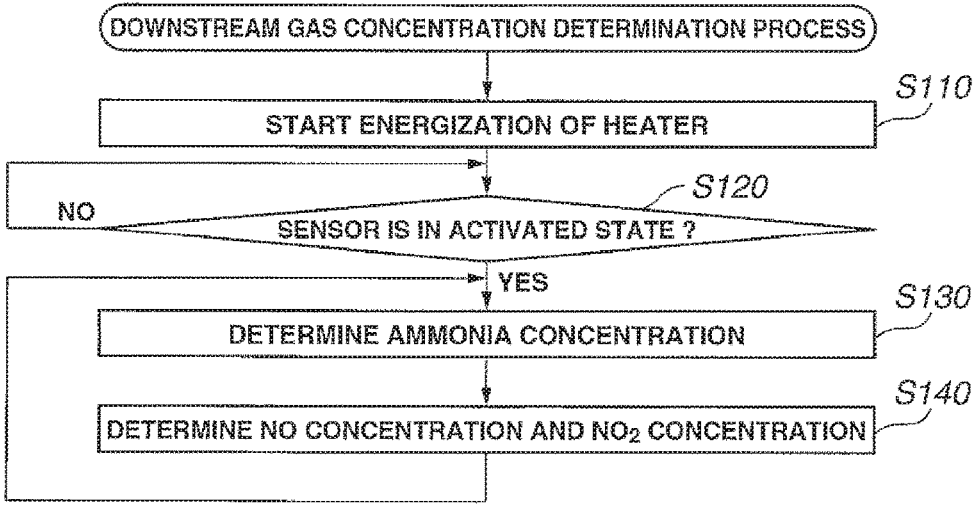
FIG. 8 is a flow chart of a downstream gas concentration determination process according to the one embodiment of the present invention.

Upon initiation of the downstream gas concentration determination process, the CPU 191 of the microcomputer 190 starts outputting a heater ON signal to the heater drive circuit 187 in step S110 as shown in FIG. 8 in the same manner as in step S10. By this signal output, the heater 160 becomes energized to heat the downstream multi-gas sensor 8.

In step S120, the CPU judges whether the downstream multi-gas sensor 8 is in an activated state in the same manner as in step S20. When the downstream multi-gas sensor 8 is not in the activated state (NO in step S120), the CPU repeats the processing of step S120 and thereby stands by until the downstream multi-gas sensor 8 becomes activated. When the downstream multi-gas sensor 8 is in the activated state (YES in step S120), the CPU determines the ammonia concentration of the exhaust gas in step S130 according to the first pumping current (Ip1)-oxygen concentration correlation formula 241 and the ammonia concentration output-ammonia concentration correlation formula 242.

In step S140, the CPU determines the NO and $NO_2$ concentrations according to the second pumping current (Ip2)-NO concentration correlation formulas 243, the negative ammonia concentration output-$NO_2$ concentration correlation formula 244, the contributory second pumping current-NO/$NO_2$ concentration correlation formulas 245 and the ammonia concentration output-ammonia concentration correlation formula 246 as mentioned above. Then, the CPU proceeds to step S130.

Furthermore, the purification controller 12 executes an injection control process to control the urea injection operations of the aqueous urea injector 5.

The procedure of the injection control process will be explained below. The injection control process is executed at regular intervals (e.g. 10 ms) during the operations of the purification controller 12.

Figure 9:
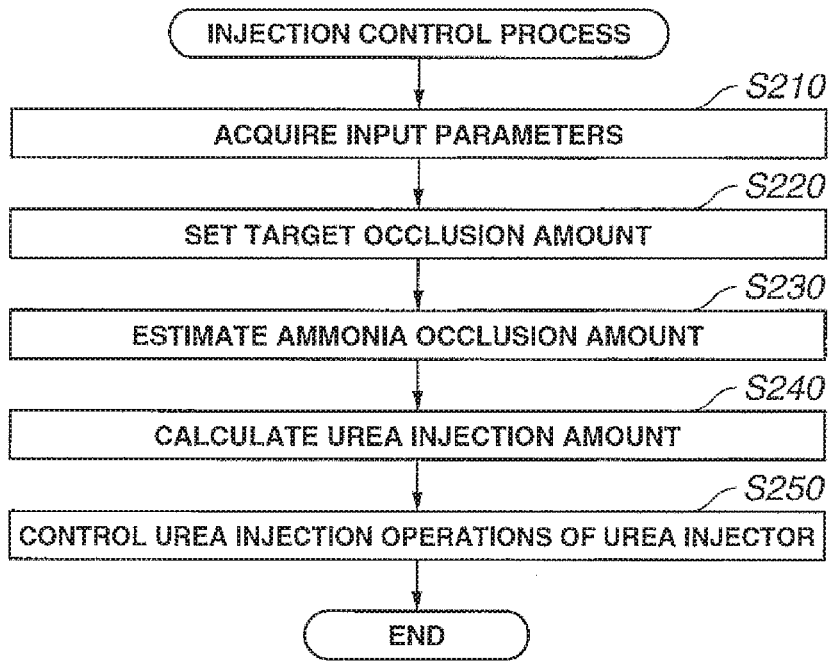
FIG. 9 is a flow chart of an injection control process according to the one embodiment of the present invention.

Upon initiation of the injection control process, the CPU 21 of the purification controller 12 acquires various input parameters in step 210 as shown in FIG. 9. The input parameters refer to the data items indicating the upstream gas temperature, the downstream gas temperature, the exhaust gas flow rate, the upstream NO concentration, the upstream $NO_2$ concentration, the downstream NOx concentration, the downstream $NO_2$ concentration and the downstream ammonia concentration.

In the present embodiment, the CPU 21 retrieves the data indicating the upstream gas temperature (referred to as "upstream gas temperature data") and the data indicating the downstream gas temperature (referred to as "downstream gas temperature data") from the upstream gas temperature signal of the upstream temperature sensor 10 and the downstream gas temperature signal of the downstream temperature sensor 11, respectively. The CPU 21 retrieves the data indicating the exhaust gas flow rate (referred to as "exhaust gas flow rate data") by communication with the electronic control unit 53. The CPU 21 retrieves the data indicating the upstream NO concentration (referred to as "upstream NO concentration data") and the data indicating the upstream $NO_2$ concentration (referred to as "upstream $NO_2$ concentration data") by communication with the upstream gas sensor controller 7. Further, the CPU 21 retrieves the data indicating the downstream NOx concentration (referred to as "downstream NOx concentration data"), the data indicating the downstream $NO_2$ concentration (referred to as "downstream $NO_2$ concentration data") and the data indicating the downstream ammonia concentration (referred to as "downstream ammonia concentration data") by communication with the downstream gas sensor controller 9.

In step S220, the CPU sets a target value of the amount of ammonia occluded in the SCR catalyst 4 (referred to as "target occlusion amount"). In the present embodiment, an average value of the upstream gas temperature and the downstream gas temperature is first determined as a temperature of the SCR catalyst 4 (referred to as "SCR catalyst temperature") based on the upstream gas temperature data and the downstream gas temperature data acquired in step S210. The target occlusion amount is then set for the determined SCR catalyst temperature with reference a predetermined adjustment factor setting map. The target occlusion amount setting map defines a correlation between the SCR catalyst temperature and the target occlusion amount and has been stored in the ROM 22.

In step 230, the CPU estimates the amount of ammonia occluded in the SCR catalyst 4 (referred to as "ammonia occlusion amount") based on the exhaust gas flow rate data, the upstream NO concentration data, the upstream $NO_2$ concentration data, the downstream NOx concentration data, the downstream $NO_2$ concentration data and the downstream ammonia concentration data acquired in step S210 as well as the urea injection amount calculated in step S240. In step S230, the latest calculated value of the urea injection amount is used.

Figure 10:
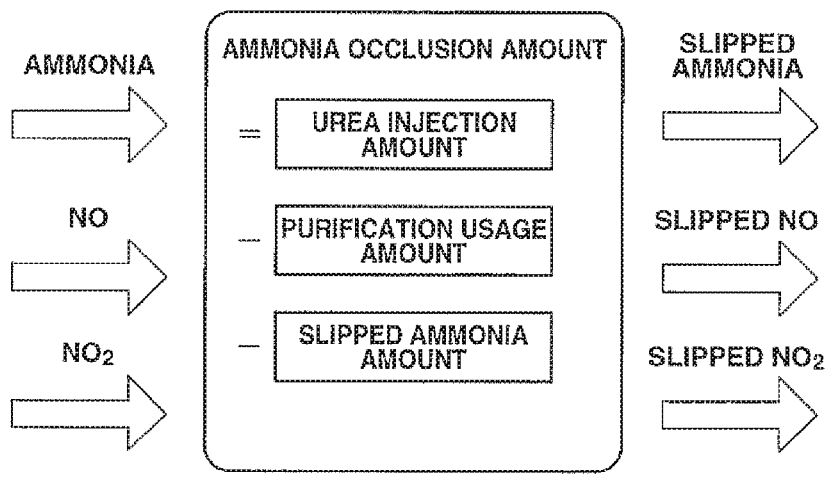
FIG. 10 is a diagram showing an ammonia occlusion amount estimation process according to the one embodiment of the present invention.

As shown in FIG. 10, the ammonia occlusion amount is estimated by subtracting a purification usage amount and a slipped ammonia amount from the urea injection amount. The purification usage amount refers to the amount of ammonia used for purification of NO and $NO_2$ at the SCR catalyst 4 and can be calculated on the basis of the following reaction formulas (1), (2) and (3).

$$2NH_3+NO+NO_2 \rightarrow 2N_2+3H_2O \tag{1}$$

$$4NH_3+4NO+O_2 \rightarrow 4N_2+6H_2O \tag{2}$$

$$8NH_3+6NO_2 \rightarrow 7N_2+12H_2O \tag{3}$$

The method for estimation of the ammonia occlusion amount will be explained in detail below by way of a specific example.

The following specific example is based on the assumptions that: the exhaust gas flow rate indicated by the exhaust gas flow rate data acquired in step S210 is 5.5238 g/s; the upstream NO concentration indicated by the upstream NO concentration data acquired in step S210 is 14.5 ppm; the upstream $NO_2$ concentration indicated by the upstream $NO_2$ concentration data acquired in step S210 is 41.5 ppm; the downstream NOx concentration indicated by the downstream NOx concentration data acquired in step S210 is 20.0 ppm; the downstream $NO_2$ concentration indicated by the downstream $NO_2$ concentration data acquired in step S210 is 5.0 ppm; the downstream ammonia concentration indicated by the downstream ammonia concentration data acquired in step S210 is 14.5 ppm; and the previous urea injection amount calculated in step S240 is 0.195 g/s.

First, the molar concentration of $NH_3$ generated per second is calculated from the ammonia injection amount as shown in the following formula (4), In the formula (4), the value "0.325" is the amount of ammonia contained in urea; and the value "60" is the molar mass of urea.

$$NH_3 \text{ molar concentration [ppm·mol/s]}=0.95\times0.325/60\times10^6=1056.419 \tag{4}$$

The molar concentration of urea required in the reaction formula (1) is calculated from the $NH_3$ molar concentration per second as shown in the following formula (5).

$$\text{Urea molar concentration [ppm·mol/s]}=1056.419\times2=2112.883 \tag{5}$$

Further, the processing operations are performed according to the reaction formulas (1), (2) and (3).

The upstream NO concentration and the upstream $NO_2$ concentration are first compared to each other. Since the upstream NO concentration is lower than the upstream $NO_2$ concentration, all of NO is used in the reaction formula (1). The molar concentration A of $NH_3$ used in the reaction formula (1) is thus calculated as shown in the following formula (6).

$$NH_3 \text{ molar concentration } A \text{ [ppm·mol/s]}=5.5238\times14.5\times2/22.4=7.151 \tag{6}$$

Since all of NO flowing from the upstream side into the SCR catalyst 4 is used in the reaction formula (1), the amount of NO used in the reaction formula (2) is 0. Consequently, the molar concentration B of $NH_3$ required for NO purification in the reaction formula (2) is 0 as shown in the following formula (7) in the case where the upstream NO concentration is lower than the upstream $NO_2$ concentration.

$$NH_3 \text{ molar concentration } B \text{ [ppm·mol/s]}=5.5238\times0\times2/22.4=0 \tag{7}$$

Then, $NO_2$ remaining without being used in the reaction formula (1) is used in the reaction formula (3). The molar concentration C of $NH_3$ used for $NO_2$ purification in the reaction formula (3) is thus calculated as shown in the following formula (8).

$$NH_3 \text{ molar concentration } C \text{ [ppm·mol/s]}=4/3\times5.5238\times(41.5-14.5)/22.4=8.8775 \tag{8}$$

Next, the downstream NO concentration and the downstream $NO_2$ concentration are compared to each other. Since the downstream $NO_2$ concentration is lower than the downstream NO concentration, all of $NO_2$ is used in the reaction formula (1). The downstream NO concentration is calculated by subtracting the downstream $NO_2$ concentration from the downstream NOx concentration as shown in the following formula (9).

$$\text{Downstream NO concentration [ppm]}=20.0-5.0=15.0 \tag{9}$$

The molar concentration D of $NH_3$ required for purification of NOx slipped without being used in the reaction formula (1) is calculated as shown in the following formula (10).

$$NH_3 \text{ molar concentration } D \text{ [ppm·mol/s]}=5.5238\times5\times2/22.4=2.46 \tag{10}$$

The molar concentration E of $NH_3$ required for purification of NO slipped to the downstream side without being used in the reaction formula (2) is calculated as shown in the following formula (11).

$$NH_3 \text{ molar concentration } E \text{ [ppm·mol/s]}=5.5238\times(15-5)/22.4=2.46 \tag{11}$$

Since all of $NO_2$ slipped to the downstream side is used in the reaction formula (1), the amount of $NO_2$ used in the reaction formula (3) is 0. Consequently, the molar concentration F of $NH_3$ required for $NO_2$ purification in the reaction formula (3) is 0 as shown in the following formula (12) in the case where the downstream $NO_2$ concentration is lower than the downstream NO concentration.

$$NH_3 \text{ molar concentration } F \text{ [ppm·mol/s]}=4/3\times5.5238\times(0)/22.4=0 \tag{12}$$

From the above calculation results, the current ammonia retention amount is determined by the following formula (13).

$$\text{Current } NH_3 \text{ retention amount [g]}=17\times[2112.883-\{(A+B+C)-(D+E+F)-5.5238\times14.5/22.4\}]\times0.01\times10^6=0.00015 \tag{13}$$

Accordingly, the ammonia occlusion amount is estimated by the following formula 14).

$$\text{Ammonia occlusion amount [g]}=\text{Previous ammonia occlusion amount}+0.00015 \tag{14}$$

After the estimation of the ammonia occlusion amount in step S230, the CPU calculates the urea injection amount in step S240 such that the ammonia occlusion amount estimated in step 230 becomes consistent with the target occlusion amount set in step S220. In step S250, the CPU sets the injection cycle and the injection period per one injection according to the calculated urea injection amount, and then, controls the urea injection operations of the aqueous urea injector 5. The injection control process once ends.

As discussed above, the purification controller 12 estimates the amount of ammonia occluded (i.e. ammonia occlusion amount) in the SRC catalyst 4, which is arranged in the exhaust pipe 52 of the diesel engine 51 so as to purify NOx in the exhaust gas of the diesel engine 51, and controls the aqueous urea injector 5 to supply ammonia as the reducing agent to the SRC catalyst 4.

More specifically, the purification controller 12 acquires the upstream NO concentration data, the upstream $NO_2$ concentration data, the downstream NOx concentration data, the downstream $NO_2$ concentration data and the downstream ammonia concentration data (step S210).

The purification controller 12 acquires the urea injection amount (step S240).

The purification controller 12 estimates the ammonia occlusion amount based on the acquired upstream NO concentration data, upstream $NO_2$ concentration data, downstream NOx concentration data, downstream $NO_2$ concentration data and downstream ammonia concentration data, the acquired urea injection amount and the reaction formulas (1), (2) and (3) for the reduction of NOx with the SCR catalyst 4 (step S230).

Then, the purification controller 12 controls the supply of urea from the aqueous urea injector 5 according to the estimated ammonia occlusion amount (step S250).

In this way, the purification controller 12 is configured to identify the upstream NO concentration, the upstream $NO_2$ concentration, the downstream NO concentration, the downstream $NO_2$ concentration and the downstream ammonia concentration by acquisition of the upstream NO concentration data, the upstream $NO_2$ concentration data, the downstream NOx concentration data, the downstream $NO_2$ concentration data and the downstream ammonia concentration data. The purification controller 12 is also configured to identify the amount of ammonia supplied to the SCR catalyst 4 by acquisition of the urea injection amount.

The purification controller 12 is further configured to estimate the ammonia occlusion amount according to the reaction formulas (1), (2) and (3) representing the reduction of NOx with the SCR catalyst 4. The reduction of NOx with the SCR catalyst 4 refers to reduction reaction between ammonia and at least one of NO and $NO_2$. Thus, the amount of ammonia reacted with NO and $NO_2$ is calculated by the purification controller 12 based on the upstream NO concentration, the upstream $NO_2$ concentration, the downstream NO concentration and the downstream $NO_2$ concentration. The amount of ammonia not occluded in the SCR catalyst 4 is then calculated by the purification controller 12 based on the amount of ammonia supplied to the SCR catalyst 4 and the downstream ammonia concentration. Namely, the purification controller 12 is configured to identify the amounts of NO, $NO_2$ and ammonia on the upstream and downstream sides of the SCR catalyst 4, and then, estimate the ammonia occlusion amount from these identified upstream and downstream gas component amounts according to the reaction formulas (1), (2) and (3). It is therefore possible for the purification controller 12 to improve the estimation accuracy of the ammonia occlusion amount.

The purification controller 12 is provided with the NOx sensor unit 101, the $NO_2$ sensor unit 102, the NOx sensor unit 201, the ammonia sensor unit 202, the upstream gas sensor controller 7 and the downstream gas sensor controller 9. The upstream gas sensor controller 7 calculates the upstream NO concentration from the upstream NOx concentration and the upstream $NO_2$ concentration (step S50). The downstream gas sensor controller 9 calculates the downstream NO and $NO_2$ concentrations from the downstream NOx concentration and the downstream ammonia concentration (step S140). In the purification controller 12, the NOx sensor unit 101 and the $NO_2$ sensor unit 102 are integrated as the upstream multi-gas sensor 6; and the NOx sensor unit 201 and the ammonia sensor unit 202 are integrated as the downstream multi-gas sensor 8.

The purification controller 12 thus uses the NOx sensor unit 101 and the $NO_2$ sensor unit 102 to detect the NOx and $NO_2$ concentrations of the exhaust gas in substantially the same region. In the upstream multi-gas sensor, the NOx sensor unit 101 and the $NO_2$ sensor unit 102 do not differ in their exhaust gas concentration detection region. By the use of such an integrated gas sensor, it is possible for the purification controller 12 to further improve the estimation accuracy of the ammonia occlusion amount. Similarly, the NOx sensor unit 201 and the ammonia sensor unit 202 do not differ in their exhaust gas concentration detection region in the downstream multi-gas sensor. It is also possible for the purification controller 12 to further improve the estimation accuracy of the ammonia occlusion amount by the use of such an integrated gas sensor.

In the above-explained embodiment, the purification controller 12 corresponds to the claimed ammonia occlusion estimation device and to the claimed purification control apparatus; the diesel engine 51 corresponds to the claimed internal combustion engine; the SCR catalyst 4 corresponds to the claimed selective catalytic reduction catalyst; and the aqueous urea injector 5 corresponds to the claimed urea supply unit.

The processing of step S210 corresponds to the claimed first data acquisition section or step; the processing of step S240 corresponds to the claimed second data acquisition section or step; the processing of step S230 corresponds to the claimed occlusion amount estimation section or step; and the processing of step S250 corresponds to the claimed supply control section or step.

The upstream NO concentration data, the upstream $NO_2$ concentration data, the downstream NOx concentration data, the downstream $NO_2$ concentration data and the downstream ammonia concentration data correspond to the claimed first concentration identification data; and the urea injection amount calculated at step S240 corresponds to the claimed second concentration identification data.

The NOx sensor unit 101 corresponds to the claimed upstream NOx sensor; the $NO_2$ sensor unit 102 corresponds to the claimed upstream $NO_2$ sensor; the NOx sensor unit 201 corresponds to the claimed downstream NOx sensor; the ammonia sensor unit 202 corresponds to the claimed downstream ammonia sensor; the processing of step S50 corresponds to the claimed upstream concentration determination section; and the processing of step S140 corresponds to the claimed downstream concentration determination section.

Although the present invention has been described with reference to the above specific embodiment, the present invention is not limited to this specific embodiment. Various changes and modifications of the above embodiment are possible within the technical scope of the present invention.

In the above embodiment, the upstream gas sensor controller 7, the downstream gas sensor controller 9 and the purification controller 12 are provided separately. It is however alternatively feasible to use, in place of the separate controllers 7, 9 and 12, an integrated control unit equipped with the functions of these controllers 7, 9 and 12.

DESCRIPTION OF REFERENCE NUMERALS

1: Urea SCR system
4: SCR catalyst

5: Aqueous urea injector
6: Upstream multi-gas sensor
7: Upstream gas sensor controller
8: Downstream multi-gas sensor
9: Downstream gas sensor controller
12: Purification controller
101: NOx sensor unit
102: $NO_2$ sensor unit
201: NOx sensor unit
202: Ammonia sensor unit

The invention claimed is:

1. An ammonia occlusion amount estimation device for estimating the amount of ammonia occluded in a selective catalytic reduction catalyst as an ammonia occlusion amount, the selective catalytic reduction catalyst being arranged in an exhaust pipe of an internal combustion engine so as to purify NOx in an exhaust gas of the internal combustion engine, the ammonia occlusion amount estimation device comprising:
a first data acquisition section that acquires first concentration identification data identifying the concentrations of NO and $NO_2$ in the exhaust gas flowing into the selective catalytic reduction catalyst as an upstream NO concentration and an upstream $NO_2$ concentration, respectively, and identifying the concentration of NO, $NO_2$ and ammonia in the exhaust gas flowing out of the selective catalytic reduction catalyst as a downstream NO concentration, a downstream $NO_2$ concentration and a downstream ammonia concentration, respectively;
a second data acquisition section that acquires second concentration identification data identifying the concentration of ammonia flowing into the selective catalytic reduction catalyst as an upstream ammonia concentration; and
an occlusion amount estimation section that estimates the ammonia occlusion amount based on the first concentration identification data acquired by the first data acquisition section and the second concentration identification data acquired by the second data acquisition section by subtracting a purification usage amount and a slipped ammonia amount from an acquired urea injection amount,
wherein the purification usage amount is calculated on the basis of the following reaction formulas (1), (2) and (3) for reduction of NOx with the selective catalytic reduction catalyst, $$2NH_3+NO+NO_2 \rightarrow 2N_2+3H_2O \quad (1)$$

$$4NH_3+4NO+O_2 \rightarrow 4N_2+6H_2O \quad (2)$$

$$8NH_3+6NO_2 \rightarrow 7N_2+12H_2O \quad (3),$$

the ammonia occlusion amount estimation device further comprising:
an upstream NOx sensor that detects, as an upstream NOx concentration, the concentration of NOx in the exhaust gas flowing into the selective catalytic reduction catalyst
an upstream $NO_2$ sensor that detects the upstream $NO_2$ concentration;
a downstream NOx sensor that detects, as a downstream NOx concentration, the concentration of NOx in the exhaust gas flowing out of the selective catalytic reduction catalyst a downstream ammonia sensor that detects the downstream ammonia concentration;
an upstream concentration determination section that determines the upstream NO concentration based on the upstream NOx concentration and the upstream $NO_2$ concentration; and
a downstream concentration determination section that determines the downstream NO concentration and the downstream $NO_2$ concentration based on the downstream NOx concentration and the downstream ammonia concentration.

2. The ammonia occlusion amount estimation device as claimed in claim 1,
wherein at least either the upstream NOx and $NO_2$ sensors or the downstream NOx and ammonia sensors are combined into one as an integrated gas sensor.

3. A purification control apparatus for controlling an urea supply unit to supply urea as a reducing agent to a selective catalytic reduction catalyst, the selective catalytic reduction catalyst being arranged in an exhaust pipe of an internal combustion engine so as to purify NOx in an exhaust gas of the internal combustion engine,
the purification control apparatus comprising:
the ammonia occlusion amount estimation device as claimed in claim 1; and
a supply control section that controls the supply of the urea from the urea supply unit based on the ammonia occlusion amount estimated by the ammonia occlusion amount estimation device.

4. The ammonia occlusion amount estimation device as claimed in claim 3, wherein the second concentration identification data is the urea supply amount.

5. The ammonia occlusion amount estimation device as claimed in claim 1,
wherein the upstream NOx and $NO_2$ sensors are combined into one as an integrated gas sensor, and the downstream NOx and ammonia sensors are combined into one as an integrated gas sensor.

6. An ammonia occlusion amount estimation method for estimating the amount of ammonia occluded in a selective catalytic reduction catalyst as an ammonia occlusion amount, the selective catalytic reduction catalyst being arranged in an exhaust pipe of an internal combustion engine so as to purify NOx in an exhaust gas of the internal combustion engine,
the ammonia occlusion amount estimation method comprising:
a first data acquisition step of acquiring first concentration identification data identifying the concentrations of NO and $NO_2$ in the exhaust gas flowing into the selective catalytic reduction catalyst as an upstream NO concentration and an upstream $NO_2$ concentration, respectively, and identifying the concentration of NO, $NO_2$ and ammonia in the exhaust gas flowing out of the selective catalytic reduction catalyst as a downstream NO concentration, a downstream $NO_2$ concentration and a downstream ammonia concentration, respectively;
a second data acquisition step of acquiring second concentration identification data identifying the concentration of ammonia flowing into the selective catalytic reduction catalyst as an upstream ammonia concentration; and
an occlusion amount estimation step of estimating the ammonia occlusion amount based on the first concentration identification data acquired by the first data acquisition step and the second concentration identification data acquired by the second data acquisition step by subtracting a purification usage amount and a slipped ammonia amount from an acquired urea injection amount, wherein the purification usage amount is calculated on the basis of the following reaction formulas (1), (2) and (3) for reduction of NOx with the selective catalytic reduction catalyst, $$2NH_3+NO+NO_2 \rightarrow 2N_2+3H_2O \tag{1}$$

$$4NH_3-4NO+O_2 \rightarrow 4N_2+6H_2O \tag{2}$$

$$8NH_3+6NO_2 \rightarrow 7N_2+12H_2O \tag{3}$$

an upstream NOx concentration is acquired from an upstream NOx sensor;

the upstream $NO_2$ concentration is acquired from an upstream $NO_2$ sensor;

the upstream NO concentration is determined based on the upstream NOx concentration and the upstream $NO_2$ concentration;

a downstream NOx concentration is acquired from a downstream NOx sensor;

the downstream ammonia concentration is acquired from a downstream ammonia sensor; and the downstream NO concentration and the downstream $NO_2$ concentration are determined based on the downstream NOx concentration and the downstream ammonia concentration.

7. A purification control method for controlling an urea supply unit to supply urea as a reducing agent to a selective catalytic reduction catalyst, the selective catalytic reduction catalyst being arranged in an exhaust pipe of an internal combustion engine so as to purify NOx in an exhaust gas of the internal combustion engine, the purification control method comprising:

a first data acquisition step of acquiring first concentration identification data identifying the concentrations of NO and $NO_2$ in the exhaust gas flowing into the selective catalytic reduction catalyst as an upstream NO concentration and an upstream $NO_2$ concentration, respectively, and identifying the concentration of NO, $NO_2$ and ammonia in the exhaust gas flowing out of the selective catalytic reduction catalyst as a downstream NO concentration, a downstream $NO_2$ concentration and a downstream ammonia concentration, respectively;

a second data acquisition step of acquiring second concentration identification data identifying the concentration of ammonia flowing into the selective catalytic reduction catalyst as an upstream ammonia concentration; and an occlusion amount estimation step of estimating, as ammonia occlusion amount, the amount of ammonia occluded in the selective catalytic reduction catalyst based on the first concentration identification data acquired by the first data acquisition step and the second concentration identification data acquired by the second data acquisition step by subtracting a purification usage amount and a slipped ammonia amount from an acquired urea injection amount, wherein the purification usage amount is calculated on the basis of the following reaction formulas (1), (2) and (3) for reduction of NOx with the selective catalytic reduction catalyst; and a supply control step of controlling the supply of the urea from the urea supply unit based on the ammonia occlusion amount estimated by the ammonia occlusion amount estimation step, $$2NH_3+NO+NO_2 \rightarrow 2N_2+3H_2O \tag{1}$$

$$4NH_3+4NO+O_2 \rightarrow 4N_2+6H_2O \tag{2}$$

$$8NH_3+6NO_2 \rightarrow 7N_2+12H_2O \tag{3}$$

wherein an upstream NOx concentration is acquired from an upstream NOx sensor;

the upstream $NO_2$ concentration is acquired from an upstream $NO_2$ sensor;

the upstream NO concentration is determined based on the upstream NOx concentration and the upstream $NO_2$ concentration;

a downstream NOx concentration is acquired from a downstream NOx sensor;

the downstream ammonia concentration is acquired from a downstream ammonia sensor; and the downstream NO concentration and the downstream $NO_2$ concentration are determined based on the downstream NOx concentration and the downstream ammonia concentration.

* * * * *